3,143,531
THERMALLY STABLE COPOLYMERS OF VI-
NYLTIN AND ETHYLENICALLY UNSATU-
RATED COMPOUNDS
Hugh E. Ramsden, Scotch Plains, N.J., assignor, by mesne assignments, to M & T Chemicals Inc., New York, N.Y., a corporation of Delaware
No Drawing. Filed May 16, 1958, Ser. No. 735,667
16 Claims. (Cl. 260—78.5)

This application is a continuation-in-part of my copending application, Ser. No. 583,612, filed May 9, 1956, now U.S. Patent 2,873,287, which application is a continuation-in-part of my copending application, Ser. No. 549,571, filed November 28, 1955, which is in turn a continuation-in-part of my prior application 520,145, filed July 5, 1955, now abandoned.

The present invention relates to novel synthetic polymeric compositions characterized by their improved thermal stability. More particularly, the invention relates to thermally stable copolymers of a compound containing at least one ethylenic unsaturation with an organo-tin compound containing at least one vinyl group attached to the tin atom.

Many polymers produced from compounds having ethylenic unsaturation, such as the vinyl and acrylic resins, are characterized by having low thermal stability. Consequently when these polymers are subjected to elevated temperatures they are prone to lose their shape due to heat distortion or they undergo discoloration or decomposition which makes they unattractive to the eye or otherwise unsatisfactory. It has been prior practice to mix with such polymers, at the time of calendering, molding, or other heat-shaping treatment, small amounts of a stabilizer, including among others certain organo-tin compounds. While this practice improves the thermal stability of the polymers, it presents certain disadvantages. Separate addition of a stabilizer to the polymer just prior to calendering, molding, or other heat-shaping treatment presents several difficulties. First, it requires stockpiling two different materials to fulfill production requirements. Secondly, it requires that small amounts of stabilizer be accurately measured and uniformly distributed throughout the polymer just prior to calendering, molding, or other heat-shaping operation. This accurate measuring and uniform mixing must generally be carried out by unskilled labor who are often not likely to carry out these operations with the degree of care that is required. Frequently, these operations are not carried out with the care required, resulting in spoilage or the production of products subject to distortion or decomposition when subjected to elevated temperatures.

It is, therefore, an object of the present invention to overcome the difficulties of prior means of thermally stabilizing polymers of an ethylenically unsaturated material for calendering, molding or otherwise heat-shaping operations.

It is another object of the present invention to provide thermally stable copolymer resins which do not require the separate addition of thermal stabilizers.

It is a further object of the present invention to provide thermally-stable copolymer resins of an ethylenically unsaturated compound with an organo-tin compound containing at least one vinyl group attached directly to the tin atom.

It is an additional object of the invention to provide a novel process for producing thermally-stable copolymers of ethylenically unsaturated compounds.

Other objects will be apparent to those skilled in the art from reading this description.

By means of the present invention, which comprises a copolymer of a major proportion of a compound having at least one ethylenic unsaturation and a minor proportion of a vinyl-substituted organo-tin compound, it is possible to provide resinous materials which have, in effect, "built-in" thermal stabilization. These copolymers are less subject to thermal distortion and decomposition than are unstabilized materials. They may be shipped to fabricators and fabricated at will by heat-shaping operations without requiring incorporation of a thermal stabilizer. Consequently, these copolymers are not subject to the frailties of unstabilized polymers which require the accurate measurement and intimate mixing of prescribed amounts of stabilizer just prior to calendering, molding and other heat-shaping operations.

The monomeric compounds containing at least one ethylenic unsaturation which form the major proportion of the copolymer resins of the invention include the vinyl monomers, such as vinyl chloride, vinyl acetate, styrene, methylvinylketone, vinylidene chloride, etc.; the acrylic esters, such as methyl and ethyl acrylates, chloracrylic esters and methacrylic esters; acrylonitrile, methacrylonitrile; and dienes such as butadiene, isoprene and chloroprene. The etheylenically unsaturated moiety of the copolymer resins may include mixtures of vinyl acetate and acrylonitrate, vinyl acetate and vinyl chloride, and vinyl chloride and vinylidene chloride, etc.

The vinyl substituted organo-tin component of the polymers of the invention which imparts thermal stability to the copolymer resins is characterized by being a tetravalent tin compound having at least one vinyl group attached directly to the tin atom. These vinyl tin compounds include those disclosed in my copending application, Ser. No. 583,612, filed May 9, 1956, entitled "Chemical Process and Product." It is intended to incorporate by reference said application in its entirety into the present application. These compounds include those vinyltin compounds having the structural formula:

wherin Vi is a vinyl group, R, R', R" may be aryl, aralkyl, alkaryl, heterocyclic or alkyl groups, X is an anion including halogen, alkoxy, aryloxy, thiocarboxylate and carboxylate groups, etc., $n$ is a whole number from 1 to 4, $a$, $b$, and $c$ are small whole numbers from 0 to 3, totalling not more than 3. Included among these compounds are:

divinyltin dichloride
butylvinyltin dichloride
tributylvinyltin
trivinyltin chloride
vinyltin trichloride
dibutylvinyltin bromide
dibutylvinyltin chloride
vinyltin trichloride
tetravinyltin
butyldivinyltin chloride
benzyldivinyltin chloride
ortho-tolyldivinyltin chloride
tricylopentodienylvinyltin dicyclopentodienylvinyltin chloride
thienylvinyltin dichloride
divinyltin diiodide
dibutyldivinyltin
triphenylvinyltin
diphenyldivinyltin
divinyltin-S,S'-bis (isooctylmercaptoacetate)
vinylbutyltin dilaurylmercaptide
vinylbutyltin-S,S'-bis (isooctylmercaptoacetate)
divinyltindilaurate
divinyltin maleate
divinyltin dimethoxide
divinyltin dibutoxide The physical and chemical properties of the various thermally-stable copolymers of the invention differ considerably depending upon the nature of the ethylenically unsaturated components. The properties are also somewhat dependent upon the proportion of vinyltin compound employed. While varying amounts of vinyltin compounds may be employed, it has been found that between about 0.5 and 20 percent by weight of copolymer is generally more satisfactory, while for best results it is desirable to employ between about 1 and 5 percent by weight of vinyltin compound.

The thermally stable copolymer resins of the invention may be readily produced by means of conventional polymerization techniques. The polymerization action may be carried out either in solution, in emulsion or as a bulk or mass polymerization in the absence of a non-reactive solvent or dispersing medium. Suitable solvents include toluene, tetrahydrofuran and water. It is desirable to employ a polymerization initiator or catalyst and heat to accelerate the polymerization. Various temperatures, such as those customarily employed by the art in polymerizing the vinyl monomers, are satisfactory. Suitable polymerization initiators or catalysts include the so-called peroxy catalysts, such as the organic peroxides, including benzoyl peroxide, lauroyl peroxide, tertiary alkyl peroxides, di (tertiary alkyl) peroxides; per-salts, such as the alkalimetal persulfates, including potassium persulfate, etc. Other polymerization catalysts include azobis-(isobutyronitrile). Other free-radical catalysts which those skilled in the polymerization art are familiar with may also be employed. Varying amounts of polymerization catalysts may be employed depending upon the rate of polymerization desired and the temperature employed. When employing vinyltin compound containing sulfur linked directly to the tin atom, such as in the case of divinyltin-S,S'-bis (isooctylmercaptoacetate), it is frequently desirable to employ larger amounts of polymerization catalyst since these vinyltin compounds often have an inhibitory effect upon the rate of polymerization. Except with the sulfur-containing vinyltin compounds, polymerization usually proceeds at about the same rate as is typical of the ethylenically-unsaturated compounds themselves.

In order to more clearly disclose the nature of the present invention, examples illustrating the preparation of the thermally-stable copolymers of the invention will hereinafter be described. It should be understood, however, that this is done solely by way of example and is intended neither to delineate the scope of the invention nor limit the ambit of the appended claims. Unless otherwise indicated, parts of materials are expressed in terms of parts by weight.

EXAMPLE 1

Copolymerization With Styrene

To a series of reactors each containing 75 parts of tetrahydrofuran, 25 parts of styrene and 0.05 part of lauroyl peroxide there were added amounts of the vinyltin compounds indicated in Table I below. The atmosphere in the reactors was replaced with nitrogen and the polymerization mixtures were maintained at room temperature for 45 days. An aliquot of each reaction mixture was then poured to form a thin layer and the tetrahydrofuran solvent was evaporated at room temperature to provide a sheet or film of the resulting cololymer. Recorded in Table I are the percent yield of copolymer film and the percent tin found in the copolymer film.

TABLE I

| Vinyltin compound | Parts of vinyltin compound | Nature of film produced | Percent yield of film | Percent tin found in film produced |
|---|---|---|---|---|
| Divinyltin dichloride. | 0.25 | Slightly cloudy semibrittle film. | 25.4 | 1.29 |
| Do. | 0.75 | ____do____ | 21.8 | 4.39 |
| Butylvinyltin dichloride. | 0.25 | ____do____ | 20.6 | 1.66 |
| Tributylvinyltin | 0.25 | ____do____ | 47.6 | 0.87 |
| Do. | 0.75 | ____do____ | 54.4 | 2.13 |

EXAMPLE 2

Copolymerization With Styrene

To a series of reactors each containing 75 parts of toluene, 25 parts of styrene and 0.05 part of lauroyl peroxide, there were added the amounts of vinyltin compounds indicated in Table II below. The atmosphere in the reactors was replaced with nitrogen and the polymerization mixtures were maintained at room temperature for 45 days. An aliquot of each reaction mixture was then poured to form a thin layer and the toluene solvent was evaporated at room temperature to provide a sheet or film of the resulting copolymer. Recorded in Table II are the percent yield of copolymer film, the calculated and analytical amounts of tin in the film.

TABLE II

| Vinyltin compound | Parts of vinyltin compound | Nature of film residue produced | Percent yield of copolymer film | Calculated percent tin in copolymer film | Percent tin found in copolymer film |
|---|---|---|---|---|---|
| Divinyltin dichloride. | 1.0 | Slightly cloudy semibrittle film. | 66.6 | 2.21 | 2.16 |
| Butylvinyltin dichloride. | 3.0 | ____do____ | 43.5 | 2.94 | 2.54 |
| Do. | 5.0 | ____do____ | 45.8 | 4.65 | 4.33 |
| Tributylvinyltin | 3.0 | ____do____ | 56.0 | 2.00 | 2.28 |
| Trivinyltin chloride. | 1.0 | ____do____ | 42.8 | 1.18 | 1.17 |
| Dibutylvinyltin bromide. | 1.0 | ____do____ | 42.8 | 0.82 | 1.11 |

EXAMPLE 3

Copolymerization With Vinyl Chloride

To a series of reactors each containing 75 parts of tetrahydrofuran, 25 parts of vinyl chloride monomer and 0.05 part of lauroyl peroxide there were added the amounts of vinyltin compound indicated in Table III below. The same procedure employed in Example 1 was followed. The results obtained are recorded in Table III below.

TABLE III

| Vinyltin compound | Parts of vinyltin compound | Nature of copolymer film produced | Percent tin found in copolymer film |
|---|---|---|---|
| Divinyltin dichloride. | 1.25 | Brittle translucent film. | 5.37 |
| Butylvinyltin dichloride. | 1.25 | do | |
| Tributyl vinyltin | 1.25 | Slightly translucent brittle film. | 3.15 |
| Trivinyltin chloride. | 0.25 | Clear brittle film. | |
| Tetravinyltin | 0.25 | Clear semi-rigid film. | |
| Dibutylvinyltin chloride. | 1.25 | Transparent brittle film. | |
| Triphenylvinyltin | 1.25 | Cloudy translucent brittle film. | 4.98 |

Copolymers produced in accordance with the foregoing example, employing vinyl chloride monomer and varying amounts of vinyltin monomers were subjected to heat stability tests in an oven at 350° F. The films were obtained by dissolving the resulting copolymer solids in sufficient tetrahydrofuran to make a 33⅓% by weight solution. An aliquot of each of the resulting solutions was poured to form thin films by allowing the tetrahydrofuran to evaporate. The resulting copolymer films were subjected to heat aging at 350° F. and examined at 10 minute intervals. These films compared with a control produced under the same conditions, except that no vinyltin compound was employed. Listed below in Table IV are the results obtained:

TABLE IV.—HEAT TEST ON COPOLYMERS AT TEMPERATURE 350° F.

| Vinyltin compound | Parts of vinyltin compound per 100 parts of vinylchloride monomer | Appearance prior to heating | After 10 minutes | After 20 minutes | Percent Sn found | Percent Cl found |
|---|---|---|---|---|---|---|
| Tetravinyltin | 1.00 | Clear | Clear | Slight yellow | 1.75 | 45.18 |
| Diphenyldivinyltin | 1.00 | do | do | do | 0.58 | 48.71 |
| Dibutyldivinyltin | 1.00 | do | do | do | 0.41 | 49.26 |
| Dibutylvinyltin chloride | 3.00 | do | do | do | 1.00 | 48.81 |
| Tributylvinyltin | 3.00 | do | do | Very slight yellow. | 0.72 | 47.31 |
| Control | No stabilizer. | do | Slight brown | Cherry red | | 55.94 |

EXAMPLE 4

Copolymerization With Vinyl Chloride

To a series of reactors each containing 100 parts of vinyl chloride monomer, 0.24 part of polyvinyl alcohol, 218 parts of distilled water and 0.6 part of lauroyl peroxide, there were added 3 parts of the vinyltin compounds indicated in Table V below. The polymerization mixtures were agitated at 120° F. for about 20 hours in an atmosphere of nitrogen gas. The polymeric products were isolated by filtration. The yield of copolymers, appearance and percentages of tin and chlorine found in the coplymers are recorded in Table V below:

TABLE V

| Vinyltin compound | Percent yield of polymer | Appearance of polymer | Percent Sn found | Percent Cl found |
|---|---|---|---|---|
| Divinyltin dilaurylmercaptide | 22 | White granular | 1.13 | 47.15 |
| Vinylbutyltin dilaurate | 90.6 | do | 0.62 | 52.24 |
| Divinyltin dilaurate | 69.2 | do | .06 | 47.47 |
| Vinylbutyltin maleate | 88.4 | do | 0.13 | 49.29 |
| Control (no vinyltin compound) | 87 | do | (¹) | 53.31 |

¹ None present.

As will be apparent to those skilled in the art, other ethylenically unsaturated monomers and mixtures thereof and other vinyltin compounds may be employed in the foregoing examples. Thus, other ethylenically unsaturated compounds which may be employed include: vinyl acetate, methylvinylketone, vinylidene chloride, methyl and ethyl acrylates, ethyl chloroacrylate, ethyl methacrylate, acrylonitrile, methacrylonitrile, butadiene, isoprene, chloroprene, and mixtures thereof such as mixtures of vinyl acetate and acrylonitrile, vinyl acetate and vinyl chloride and vinyl chloride and vinylidene chloride, etc.

Among the vinyltin compounds which may be employed in the foregoing examples are:

divinyltin dichloride
butylvinyltin dichloride
tributylvinyltin
trivinyltin chloride
vinyltin trichloride
dibutylvinyltin bromide
dibutylvinyltin chloride
vinyltin trichloride
tetravinyltin
butyldivinyltin chloride
dibutyldivinyltin
triphenylvinyltin
diphenyldivinyltin
divinyltin-S,S'-bis (isooctylmercaptoacetate)
divinyltin-S,S'-bis(isooctylmercaptoacetate)
vinylbutyltin dilaurylmercaptide
vinylbutyltin-S,S'-bis(issoctylmercaptoacetate)
divinyltindilaurate
divinyltin maleate
divinyltin dimethoxide
divinyltin dibutoxide
benzyldivinyltin chloride
ortho-tolyldivinyltin chloride
tricyclopentodienylvinyltin
dicyclopentodienylvinyltin chloride
thienylvinyltin dichloride
divinyltin diiodide Among other polymerization catalysts which may be employed in the foregoing examples are: benzoyl peroxide, tertiary butyl peroxide, di-tertiary butyl peroxide, potassium persulfate, sodium persulfate, azobis-(isobutyronitrile), etc.

The polymerization may be conducted at various temperatures, with the higher the temperature the more rapid being the rate of polymerization.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:
1. A solid copolymer having a melting point above 350° F. consisting essentially of a minor proportion of an organotin compound having the formula

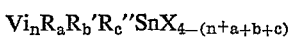

$$Vi_n R_a R_b' R_c'' SnX_{4-(n+a+b+c)}$$

wherein R, R', and R" are selected from the class consisting of aryl, aralkyl, alkaryl, heterocyclic and alkyl groups; Vi is a vinyl substituent; $n$ is a whole number from 1 to 4; $a$, $b$, and $c$ are small whole numbers from 0 to 3; $a+b+c=0$ to 3; and X is an anion selected from the class consisting of halogen, alkoxy, aryloxy, mercaptide, thiocarboxylate, and carboxylate groups; and a major proportion of an ethylenically unsaturated compound.

2. A copolymer according to claim 1 containing about 0.5%–20% by weight of organotin compound.

3. A copolymer according to claim 2, wherein the ethylenically unsaturated compound is styrene.

4. A copolymer according to claim 2, wherein the ethylenically unsaturated compound is a vinyl organic compound.

5. A copolymer according to claim 2, wherein the ethylenically unsaturated compound is vinyl chloride.

6. A copolymer according to claim 5 wherein the organotin compound is divinyltin dichloride.

7. A copolymer according to claim 5 wherein the organotin compound is butylvinyltin dichloride.

8. A copolymer according to claim 5 wherein the organotin compound is trivinyltin chloride.

9. A copolymer according to claim 5 wherein the organotin compound is vinydibutyltin chloride.

10. A copolymer according to claim 5 wherein the organotin compound is divinyltin dilaurylmercaptide.

11. A copolymer according to claim 5 wherein the organotin compound is vinylbutyltin dilaurate.

12. A copolymer according to claim 5 wherein the organotin compound is divinyltin dilaurate.

13. A copolymer according to claim 5 wherein the organotin compound is vinylbutyltin maleate.

14. A method of producing a thermally stable copolymer of an ethylenically unsaturated compound which comprises polymerizing a mixture consisting essentially of a major proportion of the ethylenically unsaturated organic compound, and a minor proportion of an organotin compound having the formula

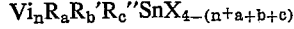

$$Vi_n R_a R_b' R_c'' SnX_{4-(n+a+b+c)}$$

wherein R, R', and R'' are selected from the class consisting of aryl, aralkyl, alkaryl, heterocyclic and alkyl groups; Vi is a vinyl substituent; $n$ is a whole number from 1 to 4; $a$, $b$, and $c$ are small whole numbers from 0 to 3; $a+b+c=0$ to 3; and X is an anion selected from the class consisting of halogen, alkoxy, aryloxy, mercaptide, thiocarboxylate, and carboxylate groups, in the presence of a free radical polymerization catalyst.

15. A method according to claim 14, in which the ethylenically unsaturated organic compound is styrene.

16. A method according to claim 14, in which the ethylenically unsaturated organic compound in vinyl chloride.

References Cited in the file of this patent

UNITED STATES PATENTS

| | | |
|---|---|---|
| 2,253,128 | Langkammerer | Aug. 19, 1941 |
| 2,258,718 | Rothrock | Oct. 14, 1941 |
| 2,489,518 | Burt | Nov. 29, 1949 |
| 2,580,277 | Boyd | Dec. 25, 1951 |
| 2,683,705 | Anspon | July 13, 1954 |
| 2,873,287 | Ramsden | Feb. 10, 1959 |
| 2,873,288 | Rosenberg | Feb. 10, 1959 |

OTHER REFERENCES

Nesmeyanov et al.: Izvest. Akad. Nauk. S.S.S.R., Otdel. Khim, Nauk, 647 (1946); 570 (1949) see JACS, page 515, fn(7) 79 (1957).